United States Patent Office 3,445,404
Patented May 20, 1969

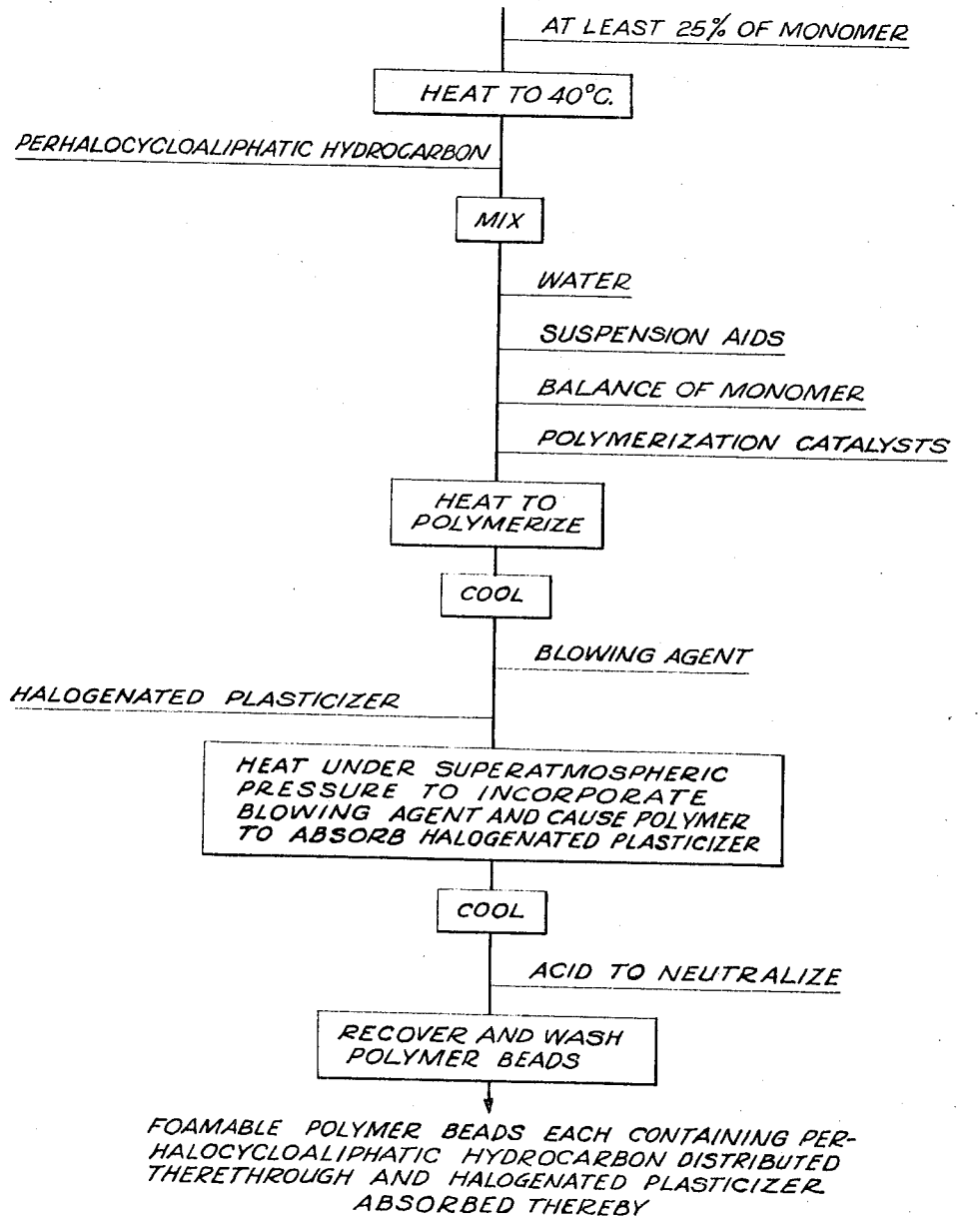

1

3,445,404
SELF-EXTINGUISHING ARYL VINYL POLYMER PRODUCTS CONTAINING PERCHLOROPENTA-CYCLODECANE AND TRIS(2,3-DIBROMOPRO-PYL)PHOSPHATE
Clifford P. Ronden and John Yu, Edmonton, Alberta, Canada, assignors, by mesne assignments, to The Dow Chemical Company, Midland, Mich., a corporation of Delaware
Filed Mar. 1, 1965, Ser. No. 435,896
Int. Cl. C08f 45/56, 45/30; C09k 3/28
U.S. Cl. 260—2.5                                    3 Claims

ABSTRACT OF THE DISCLOSURE

The inclusion of a chlorinated hydrocarbon prior to polymerization of materials such as vinyl monomers so that it becomes chemically bonded to the polymer chain followed by incorporation of a halogenated plasticizer in the suspension gives greatly more flame resistant thermoplastic material than when the fire retardant materials are used separately or added after polymerization.

This invention relates to flame resistant thermoplastic materials, and particularly to flame resistant vinyl polymers and methods for producing them. The invention is particularly applicable to foamable vinyl aryl polymers, especially polystyrene, capable of being formed into cellular insulating board and like products by continuous extrusion, with the products having self-extenguishing characteristics.

Vinyl polymers, and particularly foamable polystyrene, are widely used in applications requiring that the polymer have good fire resistance. A typical example is the now widely used insulating board produced from foamable polystyrene. The needs for polymers having fire resistant characteristics has stimulated numerous proposals by prior-art workers for including fire retarding agents of various types in the polymer, and some success has heretofore been achieved by using such fire retarding additives as the halogenated non-volatile hydrocarbons, alone or in conjunction with antimony trioxide or other antimony compounds. When halogen compounds have been employed alone, proportions thereof amounting to as much as 15–20% of the weight of thermoplastic have been necessary to achieve self-extinguishing properties in the product. When introduced before polymerization, the compounds heretofore proposed for use as fire retarding additives have resulted in a marked decrease in the molecular weight and softening point of the polymer, so that the polymer is no longer suitable for its intended purposes. The tendency for the fire retarding agent to adversely affect the quality of the polymer is of particular importance when considering the production of foamable thermoplastics, where high molecular weights and softening points are essential if satisfactory extruded or molded products are to be obtained. Attempts have also been made to introduce the fire retarding additives into the polymer after polymerization, but serious difficulties have been encountered in attempting to obtain a homogeneous product, and the quality of the mixed products has been relatively poor.

A general object of the invention is to provide thermoplastic materials which are adequately resistant to burning, yet have characteristics which make them highly satisfactory for extrusion, molding in closed molds, and other conventional fabricating procedures.

Another object is to provide self-extinguishing foamable thermoplastic materials which can be successfully fabricated into finished shapes of satisfactory strength.

A further object is to provide a markedly superior foamable polystyrene material in bead form suitable for producing self-extinguishing products by continuous extrusion.

Yet another object is to devise an improved method for producing fire resistant thermoplastic materials.

The invention is based on the discovery that the inclusion of both a perhalocycloaliphatic hydrocarbon and an ester of 2,3-dibromopropanol-1 in a vinyl polymer will provide self-extinguishing characteristics without so adversely affecting the quality of the polymer as to render the same unsuitable for extrusion and molding. Success of the invention is surprising because, when used alone, neither of the two additives will render the polymer self-extinguishing, even when the additive is employed in amounts so high as to render the thermoplastic unsuitable for extrusion and molding. It appears that the perhalocycloaliphatic hydrocarbon acts as a fire retarding agent, and the ester of 2,3-dibromopropanol-1 acts as a fire retardant which is synergistic with respect to the perhalocycloaliphatic hydrocarbon.

Best success is achieved in accordance with the invention when the polymer is provided in particulate form, with the perhalocycloaliphatic hydrocarbon distributed uniformly throughout each particle and with the ester of 2,3-dibromopropanol-1 absorbed on the polymer. Especially important embodiments of the invention provide the polymer in bead form, with the beads containing a blowing agent capable of expanding the bead when heated to the fusion temperature of the polymer. In this regard, the invention achieves self-extinguishing properties while maintaining the molecular weight and shrinking temperature of the polymer sufficiently high to yield foamed products of satisfactory strength when the thermoplastic is extruded or molded. Thus, for example, the invention provides foamable polystyrene beads which have viscosity average molecular weights well in excess of 200,000 and shrinking temperatures above 100° C.

The invention is applicable broadly to polymers derived from vinyl monomers, and is particularly applicable to the vinyl aryl polymers, especially polystyrene.

While the perhalocycloaliphatic hydrocarbons as a class are useful, particularly good results are achieved with perchloropentacyclodecane. The perhalocycloaliphatic hydrocarbon is employed in an amount equal to 1–6% of the weight of the polymer, the invention being most useful when this amount is equal to 2–4% of the polymer weight.

The combined plasticizer and synergistic fire retardant can be any ester of 2,3-dibromopropanol-1 with an acid having a molecular weight of 60–215. Of such compounds, tris (2,3-dibromopropyl) phosphate is particularly suitable. The ester is employed in an amount within the range of 1–6% of the polymer weight, amounts equal to 1–2% of the polymer weight being best. Best results are obtained when the weight ratio of perhalocycloaliphatic hydrocarbon to ester is in the range of from 1:1 to 3:1, with the combined weight of perhalocycloaliphatic hydrocarbon and ester not exceeding 7.5% of the weight of the polymer.

Combinations of more than one perhalocycloaliphatic hydrocarbon, and more than one ester of 2,3-dibromopropanol-1 can be employed.

The method embodiments of the invention are illustrated typically by the flow sheet of the accompanying drawing, and involve incorporation of the perhalocycloaliphatic compound in a portion of the vinyl monomer, followed by completion of an aqueous suspension suitable for suspension polymerization. Polymerization is accomplished analytically, with heat and time, to provide a suspension of polymer beads each having the perhalo compound distributed uniformly therethrough. The suspension is then cooled and the 2,3-dibromopropanol ester, and advantageously a blowing agent, are incorporated directly in the suspension. The suspension is then heated at 82–97° C. for 6–20 hours under super atmospheric pressure to incorporate the blowing agent in the beads and cause the beads to absorb the ester. Following this step, the suspension is neutralized, and the beads recovered, washed and dried. Suspension polymerization is best carried out in accordance with our copending applications Ser. No. 435,898 and Ser. No. 436,324, filed concurrently herewith. Incorporation of the blowing agent is advantageously in accordance with our copending application Ser. No. 435,897 filed concurrently herewith.

Example 1

To determine the fire-retarding effect of perhalocycloaliphatic hydrocarbons on thermoplastics, four separate test quantities of polystyrene beads were prepared, each containing a different proportion of perchloropentacyclodecane. The test quantities were prepared by indentical suspension polymerization procedures, in accordance with copending application Ser. No. 435,898, using the following suspension formulation:

| Ingredient: | Parts by weight |
| --- | --- |
| Styrene monomer | 110.00 |
| Demineralized water | 110.00 |
| Sodium beta naphthalene sulfonate | 0.80 |
| Tricalcium phosphate | 1.30 |
| Sodium polyacrylate (15% aqueous solution) | 1.00 |
| Azo bisisobutyronitrile | 0.08 |
| Benzoyl peroxide | 0.04 |
| T-butyl perbenzoate | 0.10 |
| 2-methyl-1-pentene (blowing agent) | 12.65 |

The amounts of perchloropentacyclodecane employed in the suspension for test quantities A–D were as follows:

| Test quantity | Perchloropentacyclodecane | |
| --- | --- | --- |
| | Parts by wt. | Percent of monomer wt |
| A | 5.5 | 5.0 |
| B | 11.0 | 11.0 |
| C | 16.5 | 15.0 |
| D | 22.0 | 20.0 |

The suspensions for all four test quantities were subjected to the same time-temperature program to accomplish polymerization. The suspension was first heated to 80° C. over a period of 1 hour, held at 80° C. for 6 hours, then heated to 90° C. over a period of 1 hour, held at 90° C. for 5 hours, then heated to 112° C. over a period of 2 hours, and held at 112° C. for 2 hours. The suspension was then cooled to room temperature and acidified to pH 1 with hydrochloric acid, the beads then being recovered, washed once with water, and dried at 70° C. for 2 hours.

Each quantity of foamable polystyrene beads so produced was tested for flammability, and to determine self-extinguishing capabilities, by melting 10 g. of the polymer beads in aluminum dish, at 270° C. in a non-circulating oven, the polymer then being removed and fired immediately with a laboratory gas burner (hot blue flame) by holding the flame 1 inch above the molten polymer for 15 seconds. All four test quantities burned and were not self-extinguishing.

Example 2

The general procedure of Example 1 was repeated for 3 additional runs, using a 10-gallon glass-lined laboratory reactor, and a time-temperature cycle in which the suspension was heated to 85° C. over 45 minutes, held at 85° C. for 5 hours, then heated to 100° C. over 45 minutes, held at 100° C. for 4.5 hours. heated to 130° C. in 1 hour, and held at 130° C. for 4.5 hours. The blowing agent was incorporated after cooling of the suspension to room temperature at the end of the polymerization, the suspension then being held at 85° C. for 15 hours with the reactor sealed. Perchloropentacyclodecane was employed, in the initial suspension, in proportions amounting to 5% and 10%, respectively, of the styrene monomer in runs F and G, none being employed in run E. Bead size, viscosity average molecular weight, and bulk density were determined in each case, and each product was tested for flammability, employing the standard ASTM Test Method D 635–56T. The results are given in the following tabulation:

| Test quantity | Percholoro-pentacylco-decane (percent of monomer wt.) | Burning rate (in./sec.) | Molecular wt. (vis. average) | Bead size distribution in percent by wt. (microns) | | | | | | | Density (lbs./cu. ft.) |
| --- | --- | --- | --- | --- | --- | --- | --- | --- | --- | --- | --- |
| | | | | 2,000 | 840 | 590 | 500 | 420 | 297 | 250 | |
| E | None | Burns (0.27, 0.375, 0.30, 0.435). | 270,000 | 0.2 | 88.4 | 9.6 | 0.4 | 0.6 | 0.4 | 0.2 | 1.5 |
| F | 5.0 | Burns (0.200, 0.256, 0.253, 0.250, 0.250). | 240,000 | 0.8 | 73.8 | 17.2 | 3.0 | 2.6 | 1.2 | 0.2 | 1.5 |
| G | 10.0 | Burns (0.400, 0.500, 0.500, 0.450, 0.550). | 195,000 | 0.4 | 58.8 | 26.8 | 5.2 | 4.8 | 3.6 | 1.4 | 1.5 |

From the tabulated results, it is clear that, when perchloropentacyclodecane is used alone, an increase in the amount of perchloropentacyclodecane in the polymer achieves only a nominal reduction in burning rate, and this nominal reduction is at the expense of a significant decrease in bead size and molecular weight.

Example 3

To determine the effect of halogenated plasticizers when used alone, seven test quantities of foamable polystyrene beads were prepared, each under the same conditions as in Example 1 but omitting the perchloropentacyclodecane. The beads of each quantity were 1190–2000 microns in size, contained 8.45% by weight volatiles, and had a viscosity average molecular weight greater than 240,000. For each test quantity H–N, 110 parts by weight of the beads, 110 parts water, 0.8 part tricalcium phosphate, 1.3 parts sodium beta naphthalene sulfonate, and a selected proportion of tris (2,3-dibromopropyl) phosphate in methanol, as indicated below, were placed in a glass container, the container closed and sealed and then maintained for 12 hours in an oil bath at 85° C., with agitation provided by rotating the sealed containers end-over-end. The beads from each container were recovered and tested for flammability in accordance with standard ASTM Test Method D 635-56T. The test quantities were also analyzed for density, fusion and mechanical strength, and viscosity average molecular weight. The results are shown by the following tabulation:

| Test quantity | Tris (2,3-dibromopropyl) phosphate in percent of polymer wt. | Flammability | Molecular wt. (vis. average) | Density (lbs./cu. ft.) | Mechanical strength |
|---|---|---|---|---|---|
| H | None | Burns | 240,000 | 1.50 | Good. |
| I | 1.00 | do | 225,000 | 1.50 | Do. |
| J | 2.50 | do | 200,000 | 1.50 | Fairly good. |
| K | 3.25 | do | 195,000 | 1.50 | Do. |
| L | 4.00 | do | 194,000 | 1.50 | Fair. |
| M | 5.00 | Self-extinguishing | 190,000 | 1.55 | Poor. |
| N | 10.00 | do | 190,000 | 1.60 | Do. |

It is thus apparent that, with tris (2,3-dibromopropyl) phosphate as the only fire-retarding agent, self-extinguishing properties can be achieved only at the expense of such severe reductions in molecular weight and fusion and mechanical strength as to render the polymer unsatisfactory for extrusion or molding.

Example 4

To demonstrate successful production of foamable polystyrene beads having self-extinguishing properties and good suitability for extrusion and molding, by use of both a perhalocycloaliphatic hydrocarbon and a halogenated plasticizer, the procedure of Example 1 was repeated for runs O-R, an amount of perchloropentacyclodecane equal to 5.0% of the styrene monomer being incorporated in the initial suspension for each run, and with an amount of the 2-methyl-1-pentene blowing agent equal to only 6.57% of the monomer weight. Various amounts of tris (2,3-dibromopropyl) phosphate were incorporated in the polymer, following the procedure of Example 3, as indicated below. The recovered beads, each having the perchloropentacyclodecane distributed therethrough and tris (2,3-dibromopropyl) phosphate absorbed thereon, were analyzed for molecular weight, bulk density, and fusion and mechanical strength. Flammability was determined by the standard ASTM Test Method D 635-56T. Results are tabulated below:

Example 5

The general procedure of Example 1 was repeated, employing the following suspension formulation.

| Ingredient: | Parts by weight |
|---|---|
| Styrene monomer | 16.600 |
| Demineralized water | 16.600 |
| Sodium beta naphthalene sulfonate | 0.197 |
| Tricalcium phosphate | 0.121 |
| Sodium polyacrylate (15% aqueous soution) | 0.151 |
| Azobisisobutyronitrile | 0.122 |
| Benzoyl peroxide | 0.061 |
| T-butyl perbenzoate | 0.015 |
| Perchloropentacyclodecane | 5.000 |

Polymerization was accomplished by heating the suspension to 80° C. over a period of 1 hour, maintaining the suspension at 80° for 6 hours, heating to 90° C. within 1 hour, maintaining the suspension at 90° C. for 5 hours, heating to 120° C. within 1 hour, and maintaining the suspension at 120° C. for 12 hours. The suspension was then cooled to room temperature and an amount of tris (2,3-dibromopropyl) phosphate equal to 2.5% of the monomer weight, and 1.93 parts by weight of a mixture of equal parts by weight 2-methyl-1-pentene and petroleum ether were added, the reactor then being sealed and maintained at 85° C. for 15 hours. The resulting polystyrene beads were self-extinguishing and had the characteristics tabulated below:

| | |
|---|---|
| Molecular weight vis. average | 225,000 |
| Volatiles (percent by weight) | 9.47 |

| Test quantity | Percholoropentacyclodecane (percent of monomer wt.) | Tris (2,3-dibromopropyl) phosphate (percent of monomer wt.) | Flammability | Molecular wt. (vis. average) | Fusion and mechanical strength | Density (lbs./cu. ft.) |
|---|---|---|---|---|---|---|
| O | 5.0 | 1.00 | Burns | 232,000 | Good | 1.5 |
| P | 5.0 | 2.50 | Self-extinguishing | 225,000 | do | 1.5 |
| Q | 5.0 | 3.25 | do | 215,000 | Fairly good | 1.5 |
| R | 5.0 | 4.00 | do | 200,000 | do | 1.5 |

It is thus seen that, while perchloropentacyclodecane alone in amounts as high as 20% of the monomer weight (Example 1), and tris (2,3-dibromopropyl) phosphate alone in amounts as high as 4% of the polymer weight (Example 3), failed to provide self-extinguishing properties, the combination of only 5.0% of perchloropentacyclodecane and 2.5% of tris (2,3-dibromopropyl) phosphate, based on styrene monomer weight, gave a polymer which was not only self-extinguishing but also entirely satisfactory from the standpoint of molecular weight and fusion and mechanical strength.

The following example, again employing both perchloropentacyclodecane and tris (2,3-dibromopropyl) phosphate, demonstrates the production of a self-extinguishing polymer with good bead size distribution.

| | |
|---|---|
| Density (lbs./cu. ft.) | 1.5 |
| Bead size distribution in percent by weight (microns): | |
| 2000 | 2.0 |
| 840 | 65.6 |
| 590 | 25.2 |
| 500 | 3.0 |
| 420 | 2.0 |
| 297 | 1.2 |
| 250 | 0.4 |
| Fusion and mechanical strength | Good |

The embodiments of the invention in which an exclusive property or privilege is claimed are defined as follows:

1. A flame resistant thermoplastic material comprising a vinyl aryl polymer containing perchloropentacyclodecane distributed therethrough and tris(2,3-dibromopropyl)phosphate absorbed thereby, said compounds being present in a weight ratio of from 1:1 to 3:1, and the combined weight thereof not exceeding 7.5% of the weight of said vinyl polymer.

2. A flame resistant, foamable thermoplastic material comprising polystyrene particles each containing perchloropentacyclodecane distributed therethrough and tris(2,3-dibromopropyl)phosphate absorbed thereby, said compounds being present in a weight ratio of from 1:1 to 3:1, and the combined weight thereof not exceeding 7.5% of the weight of the polystyrene, each of said particles also containing a blowing agent capable of expanding the particle when the material is heated to the fusion temperature of the polystyrene.

3. The method of making fire resistant, foamable polystyrene beads which comprises polymerizing styrene monomer in admixture with perchloropentacyclodecane in aqueous suspension thereby forming polystyrene beads each containing perchloropentacyclodecane, then incorporating tris(2,3-dibromopropyl)phosphate and a blowing agent into said beads by heating said suspension at 82–97° C.

under pressure of said mixture of materials, said perchloropentacyclodecane and tris(2,3 - dibromopropyl)phosphate being present in a ratio of from 1:1 to 3:1 and the combined weight thereof not exceeding 7.5% of the weight of the polystyrene.

References Cited

UNITED STATES PATENTS 3,004,935   10/1961   Raley et al.

FOREIGN PATENTS 929,652   6/1963   Great Britain.

OTHER REFERENCES

Chemical Materials Catalogue, 13th edition, 1962, Reinhold Publishing Co., p. 278, Hooker Chemical.

GEORGE F. LESMES, *Primary Examiner.*

W. J. BRIGGS, SR., *Assistant Examiner.*

U.S. Cl. X.R.

260—30.6, 45.7, 93.5